INVENTOR
Erich Martin by: Michael S. Striker
attorney

Nov. 2, 1965    E. MARTIN    3,214,907
MULTI-STAGE ENGINE AND METHOD FOR OPERATING
THE ENGINE BY COMBUSTION
Filed April 17, 1962    6 Sheets-Sheet 6

INVENTOR
Erich Martin by:
Michael S. Striker
Attorney

United States Patent Office 3,214,907
Patented Nov. 2, 1965

3,214,907
MULTI-STAGE ENGINE AND METHOD FOR
OPERATING THE ENGINE BY COMBUSTION
Erich Martin, Kirchenleite 4, Icking, Isartal, Germany
Filed Apr. 17, 1962, Ser. No. 188,155
Claims priority, application Germany, Apr. 19, 1961,
M 48,747, M 48,748
7 Claims. (Cl. 60—39.16)

The present invention relates to a multi-stage engine and to a method for operating the engine by the combustion of fuel gases. More particularly, the present invention relates to a rotary piston combustion engine comprising several stages with a fuel inlet in the first stage, and an outlet in the last stage for the discharge of burnt gases.

Conventional Otto and diesel engines, and other known combustion engines have the disadvantage of low efficiency, great fuel consumption and partly incomplete combustion resulting in the discharge of carbonoxide into the air. Furthermore, known combustion engines insufficiently utilize the capacity of the gases to expand resulting in noisy exhaust operations necessitating energy consuming mufflers.

It is one object of the present invention to overcome the disadvantages of known engines, and to provide a fluid operated engine, particularly a thermal engine, such as a combustion engine eliminating reciprocating pistons, and operating at high efficiency.

Another object of the present invention is to provide a rotary engine including a plurality of stages for completely utilizing the energy of expanding gases, such as compressed air, steam, or an ignited gaseous fuel.

Another object of the invention is to provide a method for efficiently utilizing the energy of burning fuel gases.

Another object of the invention is to provide a method for operating a rotary multi-stage engine by burning fuel gases.

In accordance with the methods of the invention, combustible fuel mixed with air is introduced at low pressure into successive expansion chambers. The fuel-air mixture is divided into two streams which are separately ignited, whereupon the two streams are guided to impinge each other so as to thoroughly mix. Thereupon, the burning fuel is introduced in two expansion chambers of the next stage in which unburnt portions of the fuel gases are ignited so that the gases further expand until they are discharged. The two streams of burning gases in the second stage may also be guided to impinge each other and to mix before they are discharged. The volumes of the expansion chambers in the second stage are substantially greater than the volumes of the expansion chambers in the first stage. It is advantageous to form thin layers of the fuel gases in the region where the same are ignited. A third stage may be added behind the second stage, and operated as described with respect to the second stage.

One method of utilizing the energy of burning gases according to the present invention comprises the steps of introducing a combustible fuel into two first chambers bounded by movable first elements; separately igniting the fuel in each first chamber so that the first elements are moved by ignited fuel gases expanding in two burning streams in the first chambers; guiding the first elements to positions in which the first chambers communicate and the burning streams impinge each other and are mixed; guiding the mixed burning stream of fuel into two second chambers having greater volumes than said first chambers and being bounded by second movable elements; separately igniting unburnt fuel of the mixed stream in the second chambers so that the second elements are moved by the burning fuel gases expanding in two streams in said second chambers; discharging burned fuel gases from the second chambers; and transmitting the energy of the moving elements to an output means.

The chambers are formed in each stage between a housing, and a pair of rotors having drive portions projecting through the chambers to the inner surface of the housing. The rotors of each stage, and also the rotors of the several stages are operatively interconnected for rotation in synchronism.

A multi-stage engine according to the invention which may be operated by compressed air, steam, or burning fuel gases has a plurality of successive stages. Each stage comprises a housing having an inlet and an outlet, the outlet of each stage communicating with the inlet of the following stage; a pair of rotors in the housing connected for synchronous rotation and forming in the housing two chambers communicating with the inlet and with the outlet, and igniting means located in the chambers of the housing in the region of the inlet.

Each rotor has at least one drive portion projecting through the respective chamber to the inner surface of the housing so that each chamber has an inlet chamber portion communicating with the inlet and a discharge chamber portion communicating with the outlet.

The drive portions of the rotors of each stage are angularly displaced in phase relative to the guide portion of the rotors of a proximate stage so that the drive portions of at least one stage prevent at any time direct communication between the inlet of the first stage and the outlet of the last stage.

The chambers of each stage have greater volumes than the chambers of the preceding stage so that when a gas is admitted through the inlet of the first stage, the rotors of all stages are rotated by the gases expanding in the inlet chamber portions of the chambers of the respective stages until the fully expanded gas is discharged from the outlet of the last stage. An outlet means, such as a shaft is connected by suitable gears to the rotors, and driven by the same.

In a combustion engine according to the invention, igniting means are provided in each housing in the region of the respective inlet for igniting the fuel in the first stage, and for igniting unburned parts of a fuel which enter each successive stage from the outlet of the preceding stage.

In the preferred embodiment of the invention, at least the rotors of one of the stages have another drive portion angularly spaced from the first mentioned drive portion to prevent a direct communication between the inlet and the outlet which would be possible in certain positions of a single drive portion. An inlet valve is provided in the inlet of the first stage, and controls the timing of the introduction of the fuel. The igniting means may be activated when the inlet chamber portions have a desired volume, or continuously effective igniting means may be provided spaced from each other and from the inlet to obtain ignition of the fuel when the inlet chamber portions have a desired volume. Additional igniting elements are advantageously provided in passages connecting the outlet of each stage with the inlet of the following stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
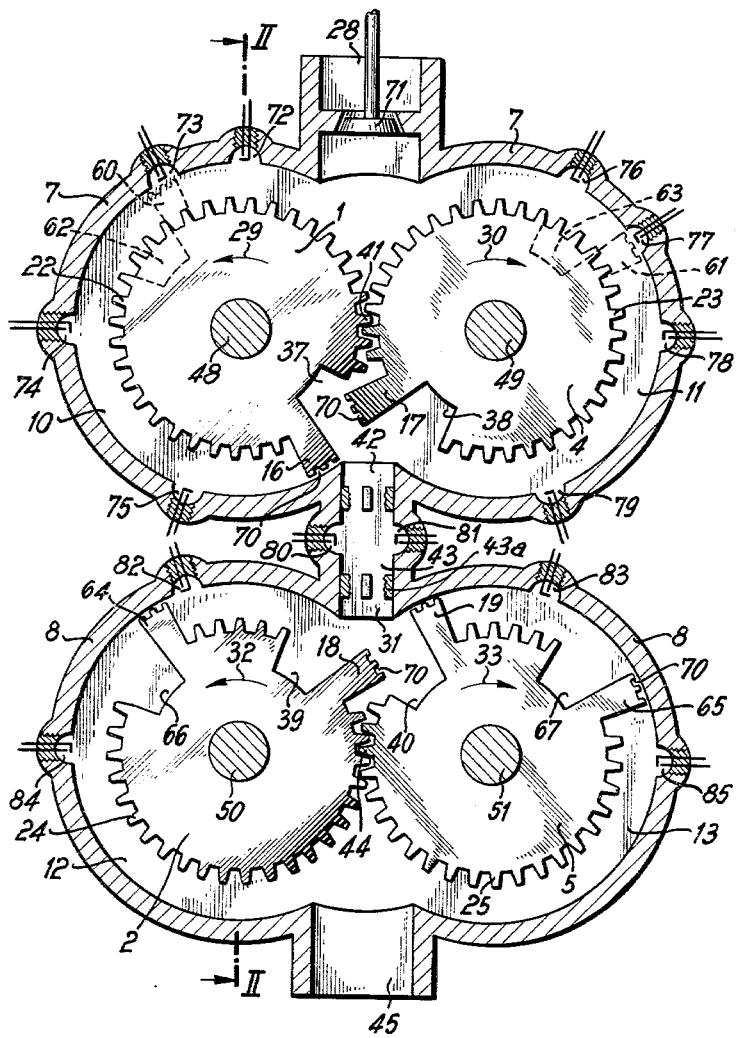
FIG. 1 is a fragmentary, partially cross-sectional view taken on line I—I in FIG. 2, and illustrating a two stage rotary combustion engine according to one embodiment of the invention.

Referring now to the drawings, the three-stage combustion engine illustrated in FIGS. 5 to 8 is identical with the two-stage combustion engine illustrated in FIGS. 1 to 4 as far as the first two stages are concerned. Therefore, corresponding parts are indicated by the same reference numerals in FIGS. 1 to 8.

Referring now to FIGS. 1 to 4, a pair of cooperating rotors 1 and 4 is located in a housing 7 in the first stage, and a pair of rotors 2, 5 is located in the housing 8 of the second stage. In the three-stage embodiment of FIGS. 5 to 8, the third stage includes a housing 9 in which a pair of rotors 3 and 6 is located.

Figure 2:
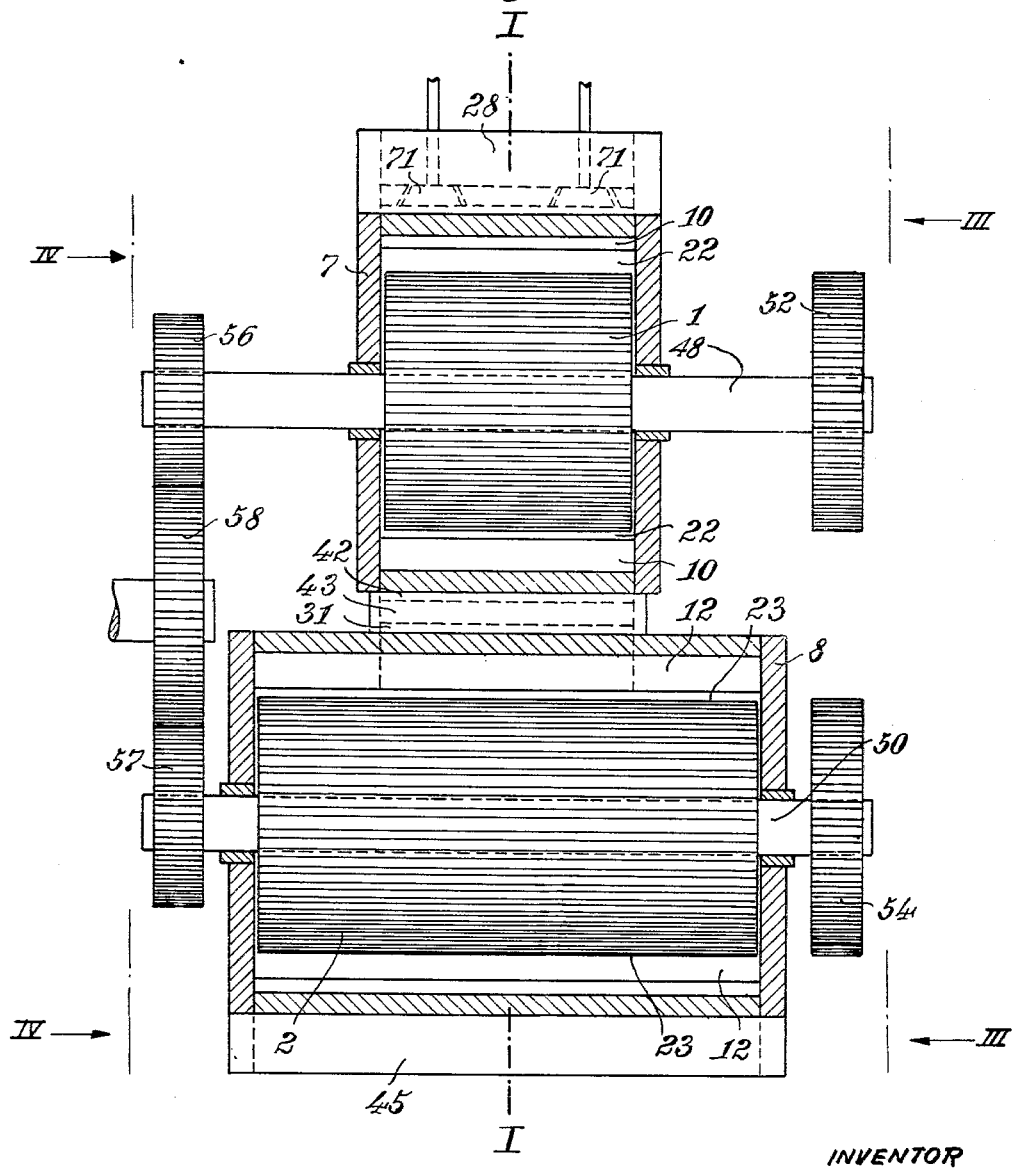
FIG. 2 is an elevation, and partially a sectional view taken on line II—II in FIG. 1.
Figure 3:
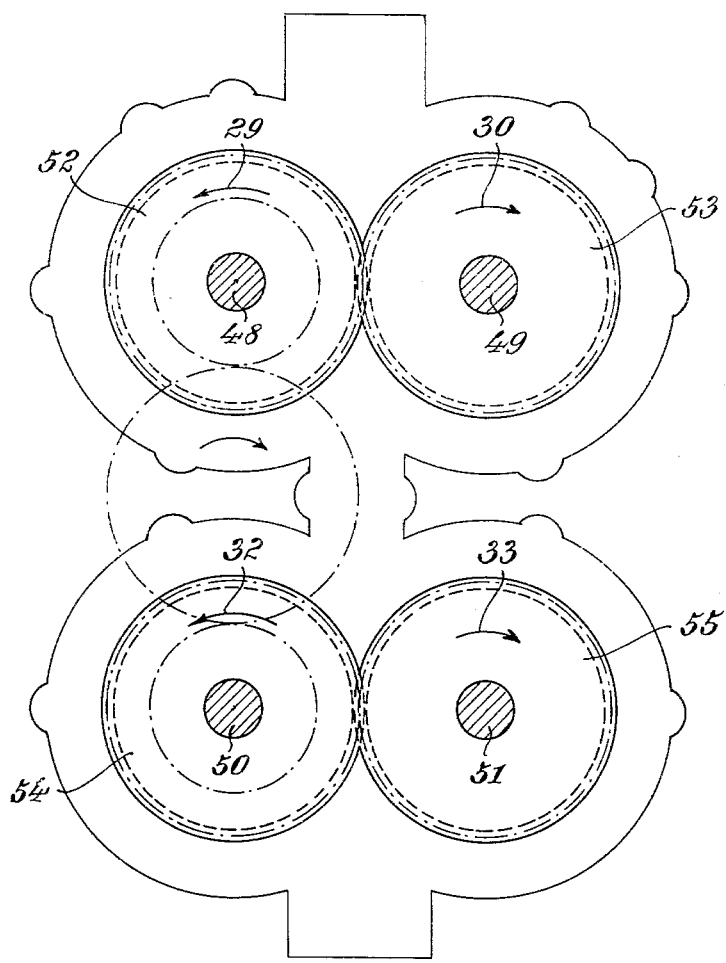
FIG. 3 is a schematic view in the direction of arrows III—III in FIG. 2.

As best seen in FIGS. 1 and 2, the rotors are of generally cyclindrically shape, and are provided with gear teeth about the peripheral surface thereof meshing in the regions 41 and 44. The peripheries of the rotors are spaced from the inner surfaces of the housings so that in the first stage intersecting annular chambers 10, 11, in the second stage chambers 12, 13, and in the third stage chambers 14, 15 are formed.

The rotors of the first stage have projecting drive portions or rotary pistons 16, 17 and are formed with corresponding recesses 37, 38 into which the drive portions pass during rotation of the rotors. The rotors 2 and 5 of the second stage have drive portions 18 and 19 and corresponding recesses 39 and 40, and in addition thereto drive portions 64, 65 and corresponding recesses 66, 67. The rotors 3 and 6 of the third stage in the embodiment of FIGS. 5 to 8 have drive portions 20, 21 and 68, 69 cooperating with corresponding recesses, not shown. The two drive portions of each rotor of the second and third stages are spaced substantially 90°.

The rotors 1 and 4 of the first stage may be provided with additional drive portions 60, 61, shown in broken lines in FIG. 1, and drive portions 60, 61 are preferably spaced 180° from the drive portions 16, 17. Corresponding recesses 62, 63 are provided in rotors 1 and 4, if the drive portions 60, 61 are provided.

The gear crowns 22, 23 on the rotors of the first stage, the gear crowns 24, 25 of the rotors of the second stage, and the gear crowns 26, 27 of the rotors of the third stage are in meshing and sealing engagement, similar to the arrangement of a gear pump. However, as explained above, the gear crowns do not extend to the inner surface of the housings, but are spaced from the same to form continuous communicating chambers in accordance with the present invention.

Figure 4:
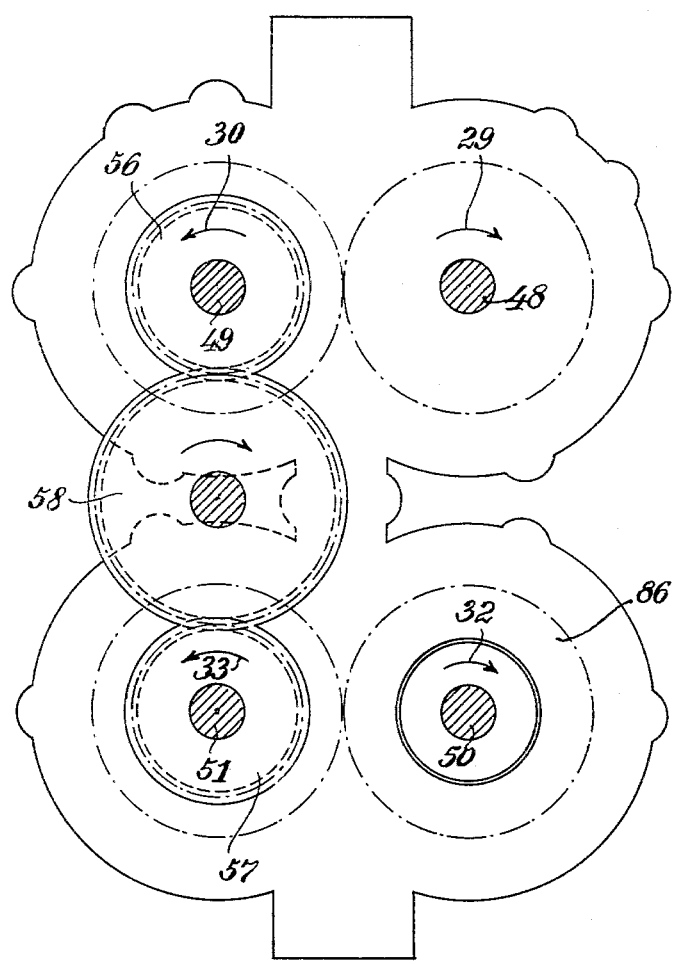
FIG. 4 is a schematic elevation in the direction of the arrows IV—IV in FIG. 2.
Figure 5:
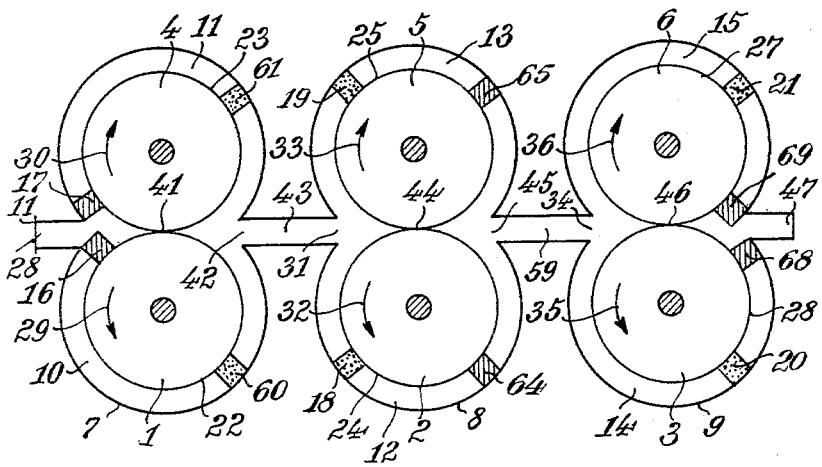
FIG. 5 is a fragmentary schematic sectional view illustrating a three-stage combustion engine according to the present invention in an initial operational position.

Rotors 1 and 2 are supported on shafts 48 and 50 projecting out of the housings and carrying gears 56 and 57 which are connected by an intermediate gear 58, as best seen in FIGS. 2 and 4. On the other side of the housings meshing gears 52, 53 are supported on shafts 48 and 49 of the first stage, and meshing gears 54, 55 are supported on shafts 50, 51 of the second stage. Corresponding gears, not shown, connect the rotors of the third stage to each other and to the rotors of the second stage in the embodiment of FIGS. 5 to 8.

An inlet 28 is provided for introducing or injecting a fuel into the chambers 10 and 11, and in the illustrated embodiment, an inlet valve means 71 is provided by which the moment and the time period of the fuel admission is determined. An outlet 42 is located opposite inlet 28, and leads to a passage 43 terminating in the inlet 31 of the second stage. An outlet 45 is provided for the second stage opposite inlet 31, and if a third stage is provided, outlet 45 leads to a passage 59 terminating in the inlet 34 of the third stage which has an outlet 47. In the two-stage embodiment of FIG. 1, exhaust gases are discharged from outlet 45, whereas the exhaust gases are discharged from outlet 47 in the three-stage embodiment of FIGS. 5 to 8. The passages 43 and 45 are very short so that dead spaces are prevented. In accordance with the invention, valves, which may cause additional losses, are not required in the passages 43 and 45.

In the combustion engine of the invention, the volume of the chambers 10, 11 is smaller than the volume of the chambers 12, 13, and if a third stage is provided, the volume of the chambers 14, 15 is greater than the volume of the chambers 12 and 13. In other words, the chambers of each stage have greater volumes than the chambers of the preceding stage, permitting an expansion of the gases during combustion.

It is advantageous to make the volume of each pair of chambers of each stage twice as great as the volume of the chambers in the preceding stage. In the embodiment of FIGS. 1 to 4, the cross-sections of the chambers of the first and second stages are the same, so that it is necessary to extend the axial length of the chambers to obtain a desired increase of volume. As best seen in FIG. 2, the rotors 2 and 5, and the housing 8 are longer than the rotors 1 and 4 and the housing 7. It is, however, also possible to provide housings and rotors having the same axial length in several stages, and to increase the diameter of the rotors and housings in each successive stage. The greater volume of the chambers of the successive stages may also be obtained by providing in the successive stages rotors of smaller diameter so that the radial distance between the peripheries of the rotors and the inner surface of the housing is progressively increased so that chambers of increasing volumes are formed in successive stages.

The rotary speeds of the rotors of successive stages can be determined by the gear train 56, 58, 57. In the illustrated embodiment, gears 56 and 57 are of the same diameter so that the rotors of all stages rotate at the same rotary speed.

It will be understood that instead of the gear train 56, 57, 58, chain wheels and chain means can be provided for obtaining the necessary synchronous rotation of all rotors. Due to the uniform rotary speed of the rotors, the drive portions 16, 17, 18, 19, and 20, 21 not only transform the energy of burning gases into energy and power, but can also carry out control functions to control the movements of the burning gases.

In order to perform this control function, the drive portions 16, 17 of the first stage not only rotate in the same direction and preferably at the same rotary speed as the drive portions 18, 19 of the second stage, but also are angularly displaced in phase relative to the drive portions 18, 19 of the second stage preferably an angle of substantially 90°, as clearly shown in FIG. 1. The exact phase angle is determined under consideration of the position of the edges of outlet 42 in stage 1, and the position of the edges of inlet 31 of the second stage.

In the embodiment of FIGS. 5 to 8, the drive portions 20, 21 are phase shifted 90° relative to the drive portions 18, 19 of the second stage. The drive portions 16, 17, and 18, 19 pass through a position in which they are located in the corresponding recesses of the respective cooperating rotor. In this position, the inlet of the respective stage directly communicates through the annular chambers with the outlet of the respective stage, which would result in pressure and energy losses. Due to the provision of the additional drive portions 64, 65 this is prevented in stage two, and the additional drive portions 60, 61 in stage 1 serve the same purpose, but are preferably spaced from the drive portions 16 and 17 angles of 180°.

The additional drive portions prevent a direct passage of working gases from the inlets to the outlets, and should be provided in at least one stage, and preferably in the first stage where the pressure is the highest to prevent a direct passage of the working gases through the housing without transfer of energy to the rotors.

A gas cushion forms between the main drive portion and the additional drive portion in each stage, and reduces the gas losses caused by the gaps between the inner surfaces of the housings and the drive portions.

Such losses are further reduced by providing axially extending recesses 70 in the end faces of the drive portions which have the effect of a labyrinth seal. Recesses 70 prevent development of a laminar flow during rotation of the rotors. A certain turbulence is created which effects a good sealing between the drive portions and the inner surfaces of the housing during rapid rotation of the rotors. The sealing effect may be further improved by introducing compressed air or oil through the recesses 70 into the gaps between the drive portions and the inner surface of the housing. However, a complete sealing of the gaps is less important in the arrangement of the present invention than between the pistons and cylinders of a conventional combustion machine, since gases passing through the gaps of the first stage are still fully utilized in the second or in successive stages of the engine of the present invention. In the last stage, the losses are immaterial, since the pressure of the gases has been substantially reduced in the first stages before the gases enter the last stage.

When the engine of the invention is used as a combustion engine, igniting means including a plurality of angularly spaced pairs of igniting elements 73, 76; 74, 78; and 75, 79 are provided in the first stage, and a plurality of angularly spaced pairs of igniting elements 82, 83 and 84, 85 are provided in the second and third stages. Igniting means 80, 81 are preferably provided in passage 43.

The igniting means may be controlled in such a manner that each pair of igniting means can be selectively activated, or that all igniting means are simultaneously activated and operative.

If the engine of the invention is operated with compressed air, or with high pressure steam, the igniting means and the valve 71 are omitted. The additional drive portions 60, 61 are provided to prevent the steam or the air from directly passing from inlet 28 into outlet 42 when the drive portions 16, 17 are in meshing engagement with recesses 38, 37. For engines of greater power, four drive portions spaced 90° from each other are advantageously provided on each rotor of the first stage, and under certain circumstances also on the rotors of the successive stages.

The engine of the present invention does not require a control valve for controlling the output power of the machine, and the regulating of the power may be exclusively effected by regulating the amount of the drive medium entering the engine through inlet 28.

When the engine of the invention is operated as a combustion engine, single drive portions 16, 17 are sufficient. In this event, however, the valve means 71 must be provided and operated to control the admission of the fuel in a well-known manner.

The timing of the valve operation, and the time periods during which the valve is open, is obtained by conventional means, for example by adjustable cam means. The adjustment takes place in such a manner that the valve opens always in a particular angular position of the rotors 1 and 4 of the first stage, but may be adjusted to close earlier or later. If the closing of valve 71 is delayed, drive portions 16 and 17 have moved away from the inlet 28 a greater distance, as would be the case when the valve is adjusted to close at an earlier moment. Consequently, the inlet chamber portions of chambers 10 and 11 between the inlet 28 and the drive portions 16 and 17 will be greater in the event that the closing of the valve is delayed, and the greater amount of fuel will have entered chambers 10 and 11. When a greater quantity of fuel is ignited by the igniting means, a greater energy is produced. In this manner, the effective energy produced by the engine can be varied by operation of the valve 71, which is important for the use of the engine in motor cars. An adjustment of the output power within a very wide range is possible by the control of the inlet valve 71. When the valve is timed in such a manner that it is closed when drive portions 16, 17 have moved only a small angle away from the inlet 28, then ignition elements 72 and 76 are activated to ignite the fuel in the inlet chamber portions between the inlet 28 and the drive portions 16, 17. If the closing of the valve is delayed until, for example, the drive portions 16, 17 have passed beyond the igniting elements 74 and 78, then igniting elements 70, 76, 73, 77 are not operated, but igniting elements 74, 78 are activated to ignite the fuel in the larger inlet chamber portions. However, it is also possible to maintain all igniting elements in active condition so that regardless of the timing of the valve operation, all igniting elements are effective to ignite the fuel at several points.

Additional igniting elements 80, 81 may be provided in the passage 43, and in the passage 45 in the three-stage engine.

The operation of an engine will now be described with reference to FIGS. 5 to 8.

When the drive portions 16 and 17 pass through the meshing region 41 of gears 22, 23, a gas pressure created by the preceding operation is still present in chambers 10, 11, in the passage 43, and in the inlet chamber portions of chambers 12 and 13. Valve 71 is closed at this moment. Drive portions 16 and 17 displace the gas from chambers 10 and 11 into chambers 12 and 13 in which a lower pressure prevails due to the greater volume of chambers 12 and 13. The released energy is transmitted to the drive portions 18 and 19 of the second stage.

When drive portions 16 and 17 have passed the inlet portion 28, inlet valve 71 is opened, and the working gas enters under pressure through inlet 28. Inlet valve 71 remains closed until drive portion 16 has passed the igniting element 72, and drive portion 17 has passed the igniting element 76. If a greater load acts on the machine, and more power is required, igniting elements 72 and 76 are inactivated, for example by disconnecting the voltage. Valve 71 may remain open until the drive portions 16 and 17 have passed the igniting elements 73 and 77, so that a greater amount of fuel is introduced into the first stage before ignition takes place. This corresponds to an increase of the filled volume in the running machine.

Figure 6:
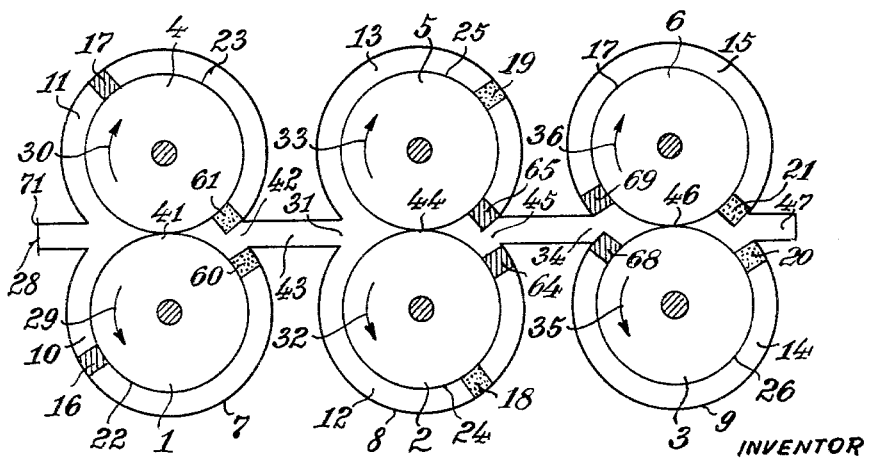
FIGS. 6, 7, and 8 are fragmentary schematic sectional views corresponding to FIG. 1 and illustrating successive operational positions assumed by the rotors after turning through 90°.
Figure 7:
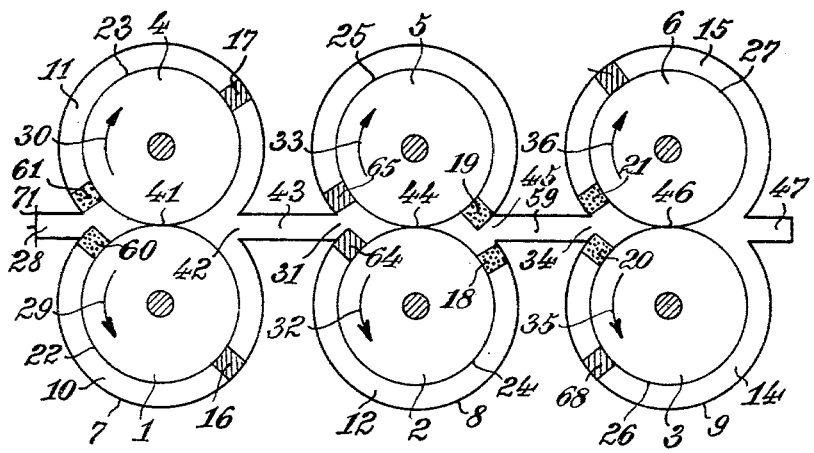
Figure 8:
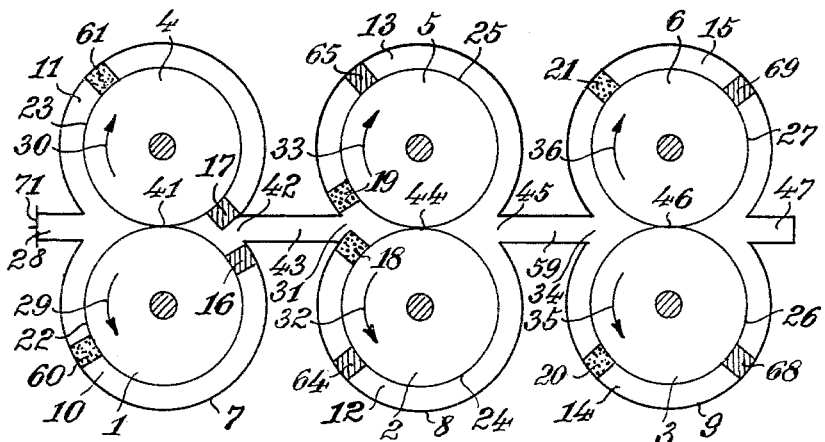

As soon as the igniting elements are activated or energized, as shown in FIG. 6, the fuel is ignited, and expands. The drive portions 16 and 17 are urged with great force to move in chambers 10 and 11 toward the outlet opening 42, as shown in FIG. 7 and FIG. 8. The energy of the drive portions is transmitted to the rotors 1 and 4, which drive shafts 48 and 49, since all shafts are interconnected, any shaft may be used as an output shaft, and for example, the gear 86 may be used for this purpose, as shown in FIG. 4. The drive portions 16 and 17 also force the gases of the previous operation into the inlet chamber portions of chambers 12 and 13 so that drive portions 18 and 19 are driven.

In order to prevent that chambers 12 and 13 directly communicate with outlet 45 when drive portions 18 and 19 move through the meshing region of gear crowns 24 and 25, which would result in discharge of the still uncompletely burned gases, the drive portions 64 and 65 assume a position blocking communication between chambers 12 and 13 and outlet opening 45 as shown in FIGS. 7 and 8.

As soon as drive portions 16 and 17 have passed the edges of outlet opening 42, which takes place shortly after the position of FIG. 8, the high pressure gas, which is still burning, can enter through outlet opening 42 and inlet opening 32 into chambers 12 and 13 of the second stage where the above-described expulsion of the remaining gases to the next stage takes place.

The sequence of operations regarding chambers 12 and 13 on one hand, and chambers 14 and 15 on the other hand is the same as described with reference to chambers 10, 11 and 12, 13. Due to the fact that the volume of chambers 12 and 13 is greater than the volume of chambers 10 and 11, an expansion of the burning fuel gases can take place, and the same is true for the expansion of the burning gases passing from chambers 12, 13 to chambers 14 and 15.

FIGS. 5 to 8 illustrate four successive operational positions in each of which the rotors have turned through 90°.

A further adjustment of the output power of the engine is possible by a variation of the richness of the fuel-air mixture.

At all dimensions, the timing of the ignition must be adjusted corresponding to the timing of the inlet valve 71, and the corresponding variation of the volume of the inlet chamber portions formed between the moving drive portions, and the inlet. A combustion engine according to the invention need not be operated with momentary ignition, as in conventional four stroke engines, but is preferably operated with continuously active igniting means. The igniting elements 72 to 79 are provided in the first stage. Spark plugs may be used which continuously produce sparks, if an early and thorough ignition is desired. If all igniting elements simultaneously operate, the fuel will be ignited as soon as the first igniting elements 72, 76 have been passed by the drive portions 16, 17. When drive portions 16, 17 pass the igniting elements 73 and 77, unburnt parts of the fuel are ignited, and the following igniting elements are effective in the same manner to assure ignition of any unburnt part of the fuel. Consequently, a very thorough combustion has already taken place when the two streams of burning fuel gases impinge each other in the region of outlet 42 after having passed through the chambers 10 and 11. The very forceful impact of the gas streams causes turbulence and a very thorough mixture of the burning fuel-air mixture, which results in the creation of further ignitable fuel-air mixtures, since fuel particles which could not be previously ignited, are thoroughly mixed with oxygen. An incomplete mixture of fuel with air may be present in the first stage, since the fuel-air mixture is only an extremely short time in the first stage. The gas mixture passes through outlet opening 42, passage 43, and inlet opening 31 into the second stage where the igniting elements 82, 83, and if necessary the igniting elements 84 and 85 ignite unburnt parts of the gases so that the same is completely burnt.

If necessary, a third stage is provided as explained with reference to FIGS. 5 to 8, in which additional igniting means may cause further igniting of unburnt gas parts. In this manner, the fuel is burnt completely, and all its energy transformed into kinetic energy.

Since the volumes of the chambers 10, 11, 12, 13, and 13, 14 increases in each stage, an almost complete expansion of the fuel gases is achieved, so that the same are discharged in the open air at a very low pressure and without producing substantial noise so that no muffler may be required.

The igniting elements are either conventional spark plugs, but may be provided in the form of continuously operating spark gaps or glowing bodies. Particularly, the complete ignition of all the fuel gases can be further assured by providing glowing grids, or multiple point spark-ing bodies in the passages 43 and 59. Additionally, fixed catalysers 43a, such as platinum sponges may be provided, which improve the combustion. Due to the particularly intense effect of a continuous ignition according to the present invention which is effective during the entire passage of the combustible gases through the engine, taken in conjunction with the long combustion period provided by the engine, the absolutely complete burning of all combustible substances in the gas-air mixture is achieved. The combustion can be further intensified by guiding the gases, particularly in the passages 43, 59 in a very thin layer which is penetrated by igniting elements.

In order to overcome difficulties which may be caused by thermal expansion of the rotors, and in order to reduce noise, it is preferred to make the rotors of stacked superimposed narrow gears having oblique teeth. This construction of the rotors also permits a thorough cooling from the inside of the rotors.

An engine according to the invention compares with a conventional Otto motor in the following manner. Assuming that the crank shank of an Otto motor makes 4,500 r.p.m., 75 revolutions per second or 150 piston strokes per second take place. Since only one piston stroke is available for the combustion, the time available for combustion is 150th of a second.

Assuming that the rotors of the engine of the invention rotate at 4,500 r.p.m., 75 revolutions take place per second. In a three-stage engine, each fuel charge remains in the engine $\frac{1}{25}$ of a second, which corresponds to the time available for combustion. This value is substantially valid only for the peak of each gas charge, considering that the peak of each gas charge in the first stage prevails for a somewhat shorter time. The duration of the same peak in the passages 43, 59 is not considered, but must be added, so that the entire duration of each peak has the above calculated values. The middle part, and the ends of each gas charge last substantially longer, for example the end of each gas charge lasts twice as long as the peak, since the end of the gas charge is discharged only after the second revolution of the rotor from the respective stage, so that its duration is about $\frac{1}{16}$ of a second. Consequently, the engine of the present invention has a nine times greater combustion period than a conventional four stroke combustion engine.

From the above description of combustion engines in accordance with the present invention, it will become apparent that the present invention provides a method for utilizing the energy of burning gases, and that the method includes the step of separately igniting the fuel in two chambers so that the drive portions are moved by ignited fuel gases expanding in two burning streams in the chambers until the two burning streams inpinge each other and effect a particularly thorough mixing of the fuel-air mixture.

The combustion of the fuel gases is a continuous process, and does not include the suction stroke and the compression stroke of conventional four stroke combustion engines. In this manner, a particularly thorough and complete combustion of the fuel gases, which are retained for a longer time in the engine, is obtained.

Due to the fact that the available volume of successive stages is increased, an economical expansion of the burning gases takes place so that gases discharged from the last stage have a very low pressure.

A particular advantage of the method of the invention resides in that the fuel gases may have an excess of air, since due to the long combustion time, together with the thorough mixture by the impinging gas streams, and the repeated and continuous ignition, a complete combustion of the fuel-air mixture is obtained irrespective of the low pressure. In this manner, at full load, as well as at partial load, the same specific fuel consumption takes place. By suitably selecting the amount of excessive air in the mixture, the temperature of the burning and expanding fuel-air mixture can be maintained at a low level which is favorable for the efficiency and long span of life of the engine.

It will be understood that each of the elements described above, or two or more together, may also find a useful application in other types of engines differing from the types described above.

While the invention has been illustrated and described as embodied in multi-stage combustion engine, and a method for operating the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be secured by Letters Patent is:

1. A rotary multi-stage engine having a plurality of successive stages, each stage comprising a housing having an inlet and an outlet, the outlet of each stage communicating with the inlet of the following stage, a pair of rotors in said housing connected for synchronous rotation and forming in said housing two chambers communicating with said inlet and said outlet, each rotor having at least one drive portion projecting through the respective chamber to the inner surface of said housing and moving along the same during rotation of said rotor so that each chamber has an expanding inlet chamber portion communicating with said inlet and a contracting discharge chamber portion communicating with said outlet; igniting means located in each of said housings of said stages in each of said inlet chamber portions; said drive portions of said rotors of each stage being angularly displaced in phase relative to the drive portions of the rotors of a proximate stage so that at any time said drive portions of at least one stage engage the inner surface of the respective housing to prevent direct communication between the inlet of the first stage and the outlet of the last stage whereby when a gas is admitted through the inlet of the first stage, said rotors of the first stage are rotated by gases expanding in said inlet chamber portions, and said rotors of the following stages are rotated by gases expanding in said inlet chamber portions of the respective successive stage until the gases are discharged from the outlet of the last stage; and output means connected to and driven by said rotors.

2. A rotary multi-stage engine having a plurality of successive stages, each stage comprising a housing having an inlet and an outlet, the outlet of each stage communicating with the inlet of the following stage, a pair of rotors in said housing connected for synchronous rotation and forming in said housing two chambers communicating with said inlet and said outlet, said rotors having peripheral gears meshing with each other, each rotor having two angularly spaced drive portions projecting through the respective chamber to the inner surface of said housing and moving along the same during rotation of said rotor so that each chamber has an expanding inlet chamber portion communicating with said inlet and a contracting discharge chamber portion communicating with said outlet, each rotor having two recesses for receiving said drive portions of the other rotor during rotation; igniting means located in each of said housings of said stages in each of said inlet chamber portions; said drive portions of said rotors of each stage being angularly displaced in phase relative to the drive portions of the rotors of a proximate stage so that at any time said drive portions of at least one stage engage the inner surface of the respective housing to prevent direct communication between the inlet of the first stage and the outlet of the last stage whereby when a gas is admitted through the inlet of the first stage, said rotors of the first stage are rotated by gases expanding in said inlet chamber portions, and said rotors of the following stages are rotated by gases expanding in said inlet chamber portions of the respective successive stage until the gases are discharged from the outlet of the last stage; and output means connected to and driven by said rotors.

3. An engine as set forth in claim 2 wherein said two drive portions and two recesses of the first stage are angularly spaced from each other an angle of 180 degrees, and wherein said two drive portions and two recesses of the successive stages are spaced from each other an angle of substantially 90 degrees.

4. A rotary multi-stage engine having a plurality of successive stages, each stage comprising a housing having an inlet and an outlet, the outlet of each stage communicating with the inlet of the following stage, a pair of rotors in said housing connected for synchronous rotation and forming in said housing two chambers communicating with said inlet and said outlet, said rotors having peripheral gears meshing with each other, each rotor having at least one drive portion projecting through the respective chamber to the inner surface of said housing and moving along the same during rotation of said rotor so that each chamber has an expanding inlet chamber portion communicating with said inlet and a contracting discharge chamber portion communicating with said outlet, each rotor having at least one recess for receiving said drive portion of the other rotor during rotation; igniting means located in each of said housings of said stages in each of said inlet chamber portions; said drive portions of said rotors of each stage being angularly displaced in phase relative to the drive portions of the rotors of a proximate stage so that at any time said drive portions of at least one stage engage the inner surface of the respective housing to prevent direct communication between the inlet of the first stage and the outlet of the last stage; said chambers of each stage having greater volumes than the chambers of the preceding stage whereby when a gas is admitted through the inlet of the first stage, said rotors of the first stage are rotated by gases expanding in said inlet chamber portions, and said rotors of the following stages are rotated by gases expanding in said inlet chamber portions of the respective successive stage until the gases are discharged from the outlet of the last stage; and output means connected to and driven by said rotors.

5. A rotary multi-stage combustion engine having a plurality of successive stages, each stage comprising a housing having an inlet and an outlet, the outlet of each stage communicating with the inlet of the following stage, a pair of rotors in said housing connected for synchronous rotation and forming in said housing two chambers communicating with said inlet and said outlet, each rotor having at least one drive portion projecting through the respective chamber to the inner surface of said housing and moving along the same during rotation of said rotor so that each chamber has an expanding inlet chamber portion communicating with said inlet and a contracting discharge chamber portion communicating with said outlet, a plurality of angularly spaced igniting means located in each said housing in the region of said inlet chamber portions spaced along the path of movement of said drive portions for igniting fuel introduced through said inlet; said drive portions of said rotors of each stage being angularly displaced in phase relative to the drive portions of the rotors of a proximate stage so that at any time said drive portions of at least one stage engage the inner surface of the respective housing to prevent direct communication between the inlet of the first stage and the outlet of the last stage; said chambers of each stage having greater volumes than the chambers of the preceding stage whereby when a fuel gas is admitted through the inlet of the first stage, said rotors of the first stage are rotated by ignited fuel gases expanding in said inlet chamber portions, and said rotors of the following stages are rotated by fuel gases unburned in the preceding stage and ignited and expanding in said inlet chamber portions of the respective successive stage until the burned fuel gases are discharged from the outlet of the last stage; and output means connected to and driven by said rotors.

6. A rotary multi-stage combustion engine having a plurality of successive stages, each stage comprising a housing having an inlet and an outlet, the outlet of each stage communicating with the inlet of the following stage, a pair of rotors in said housing connected for synchronous rotation and forming in said housing two chambers communicating with said inlet and said outlet, said rotors having peripheral gears meshing with each other, each rotor having at least one drive portion projecting through the respective chamber to the inner surface of said housing and moving along the same during rotation of said rotor so that each chamber has an expanding inlet chamber portion communicating with said inlet and a contracting discharge chamber portion communicating with said outlet, each rotor having at least one recess for receiving said drive portion of the other rotor during rotation; igniting means located in each said housing in the region of said inlet and of each of said inlet chamber portions for igniting fuel introduced through said inlet; said drive portions of said rotors of each stage being angularly displaced in phase relative to the drive portions of the rotors of a proximate stage so that at any time said drive portions of at least one stage engage the inner surface of the respective housing to prevent direct communication between the inlet of the first stage and the outlet of the last stage; said chambers of each stage having greater volumes than the chambers of the preceding stage whereby when a fuel gas is admitted through the inlet of the first stage, said rotors of the first stage are rotated by ignited fuel gases expanding in said inlet chamber portions, and said rotors of the following stages are rotated by fuel gases unburned in the preceding stage and ignited and expanding in said inlet chamber portions of the respective successive stage until the burned fuel gases are discharged from the outlet of the last stage; and output means connected to and driven by said rotors.

7. A combustion engine as set forth in claim 6 and including passages connecting the outlet of each stage with the inlet of the following stage; and including a catalyst located at least in one of said passages between the housings of the stages.

References Cited by the Examiner
UNITED STATES PATENTS

| | | | |
|---|---|---|---|
| 927,781 | 7/09 | Farrow | 123—12 |
| 1,155,335 | 10/15 | Bricknell et al. | 123—12 |
| 1,184,650 | 5/16 | Ingraham | 123—12 |
| 1,326,684 | 12/19 | Newland | 123—12 |
| 1,756,897 | 4/30 | Bilsky | 123—119 |
| 1,856,011 | 4/32 | Woodward | 123—12 |
| 1,919,355 | 7/33 | Bancroft | 60—39.16 |
| 1,923,500 | 8/33 | Northey | 123—12 |
| 2,631,428 | 3/53 | Shames | 60—39.17 |
| 2,920,610 | 1/60 | Breelle | 123—13 |
| 2,981,057 | 4/61 | Buttler | 60—29 |
| 3,043,095 | 7/62 | Sturtz | 60—29 |

SAMUEL LEVINE, *Primary Examiner.*

ABRAM BLUM, *Examiner.*